United States Patent
Yadav et al.

(10) Patent No.: US 7,857,244 B2
(45) Date of Patent: Dec. 28, 2010

(54) SHAPE ENGINEERING OF NANOPARTICLES

(75) Inventors: Tapesh Yadav, Longmont, CO (US); Karl Pfaffenbach, Longmont, CO (US)

(73) Assignee: PPG Industries Ohio, Inc., Cleveland, OH (US)

( * ) Notice: Subject to any disclaimer, the term of this patent is extended or adjusted under 35 U.S.C. 154(b) by 298 days.

(21) Appl. No.: 11/641,048

(22) Filed: Dec. 19, 2006

(65) Prior Publication Data

US 2010/0230517 A1  Sep. 16, 2010

Related U.S. Application Data

(62) Division of application No. 10/898,847, filed on Jul. 26, 2004, now Pat. No. 7,178,747, which is a division of application No. 10/113,315, filed on Mar. 29, 2002, now Pat. No. 6,832,735.

(60) Provisional application No. 60/346,089, filed on Jan. 3, 2002.

(51) Int. Cl.
*B02C 19/00* (2006.01)
(52) U.S. Cl. .................... 241/23; 977/900
(58) Field of Classification Search ................ 241/23, 241/30, 65; 977/840, 900
See application file for complete search history.

(56) References Cited

U.S. PATENT DOCUMENTS

| | | | |
|---|---|---|---|
| 5,187,220 A * | 2/1993 | Richart et al. ............... 524/441 |
| 5,342,609 A * | 8/1994 | Meeh et al. ................ 424/9.32 |
| 5,590,387 A | 12/1996 | Schmidt et al. |
| 5,718,388 A * | 2/1998 | Czekai et al. ................ 241/21 |
| 5,872,070 A | 2/1999 | Dismukes et al. |
| 5,997,832 A | 12/1999 | Lieber et al. |
| 6,117,541 A | 9/2000 | Frisk |
| 6,283,812 B1 | 9/2001 | Jin et al. |
| 6,399,037 B1 | 6/2002 | Pflug et al. |
| 6,440,243 B1 | 8/2002 | Tan et al. |
| 6,498,208 B2 | 12/2002 | Border et al. |
| 6,565,873 B1 * | 5/2003 | Shefer et al. ................ 424/426 |
| 6,663,948 B1 | 12/2003 | Taklyama et al. |
| 6,667,360 B1 | 12/2003 | Ng et al. |
| 6,682,872 B2 | 1/2004 | Sachdev et al. |
| 6,689,823 B1 | 2/2004 | Bellare et al. |
| 6,693,143 B2 | 2/2004 | Pflug |
| 6,706,795 B1 | 3/2004 | Garti et al. |
| 2002/0097127 A1 * | 7/2002 | Fujiwara et al. ............. 336/178 |
| 2003/0031721 A1 * | 2/2003 | Bogue ........................ 424/490 |

OTHER PUBLICATIONS

Jiang et al., "CuO Nanowired Can be Synthesized by Heating Copper Substrates in Air," NanoLetters, published on web Oct. 24, 2002, vol. 2, No. 12, Dec. 2002.

Jiang et al., "Crystalline Silver Nanowires by Soft Solution Processing," NanoLetters, published on web Jan. 3, 2002, 2002, vol. 2, No. 2, 165-168.

Zhang et al., "Lithium-Assisted Self-Assembly of Aluminum Carbide Nanowires and Nanoribbons," NanoLetters, published on web Dec. 14, 2001, 2002, vol. 2, No. 2, 105-108.

(Continued)

*Primary Examiner*—Mark Rosenbaum
(74) *Attorney, Agent, or Firm*—Donald R. Palladino (57) ABSTRACT

Methods for preparing high aspect ratio nanomaterials from spherical nanomaterials useful for oxides, nitrides, carbides, borides, metals, alloys, chalcogenides, and other compositions.

16 Claims, 6 Drawing Sheets

OTHER PUBLICATIONS

Buhro et al., "Semiconductor Nanocrystals Shape Matters," Nature Materials, vol. 2, Mar. 2003.

Wang et al., "Inorganic Materials Nanocrystals branch out," Nature Materials, vol. 2, Jun. 2003.

Wu et al., "Block-by-Block Growth of Single-Crystalline Si/SiGe Superlattice Nanowires," NanoLetters, published on web Jan. 19, 2002, 2002, vol. 2, No. 2, 83-86.

* cited by examiner

SHAPE ENGINEERING OF NANOPARTICLES

RELATED APPLICATIONS

The present application is a divisional of U.S. patent application Ser. No. 10/898,847, filed Jul. 26, 2004, which is a divisional of U.S. patent application Ser. No. 10/113,315, filed on Mar. 29, 2002, now U.S. Pat. No. 6,832,735 entitled "POST-PROCESSED NANOSCALE POWDERS AND METHODS FOR SUCH POST-PROCESSING," which claims the benefit of U.S. Provisional Application No. 60/346,089 filed on Jan. 3, 2002, the specification of which is incorporated herein by reference in its entirety.

BACKGROUND OF THE INVENTION

1. Field of the Invention

The present invention relates, in general, to nanoscale powders, methods for their manufacture, and, more particularly, to post-processing of nanoscale powders.

2. Relevant Background

Powders are used in numerous applications. They are the building blocks of electronic, telecommunication, electrical, magnetic, structural, optical, biomedical, chemical, thermal, and consumer goods. On-going market demand for smaller, faster, superior and more portable products has demanded miniaturization of numerous devices. This, in turn, has demanded miniaturization of the building blocks, i.e. the powders. Sub-micron and nanoscale (or nanosize, ultrafine) powders, with a size 10 to 100 times smaller than conventional micron size powders, enable quality improvement and differentiation of product characteristics at scales currently unachievable by commercially available micron-sized powders.

Nanopowders in particular and sub-micron powders in general are a novel family of materials whose distinguishing feature is that their domain size is so small that size confinement effects become a significant determinant of the materials' performance. Such confinement effects can, therefore, lead to a wide range of commercially important properties. Nanopowders, therefore, are an extraordinary opportunity for design, development and commercialization of a wide range of devices and products for various applications. Furthermore, since they represent a whole new family of material precursors when conventional coarse-grain physiochemical mechanisms are not applicable, these materials offer unique combination properties than can enable novel and multifunctional components of unmatched performance. Commonly-owned U.S. Pat. No. 6,228,904, which along with the references contained therein is hereby incorporated by reference in full, teach some applications of sub-micron and nanoscale powders. Co-pending application Ser. No. 09/638,977 now U.S. Pat. No. 6,569,397, which is assigned to the assignee of the present invention and which along with the references contained therein is hereby incorporated by reference in full, teaches exemplary methods for producing high purity nanoscale materials and their applications.

In most applications, powders need to satisfy a complex combination of functional and processing requirements. Sub-micron powders in general, and nanoscale powders in particular fail to meet all these requirements. This invention is directed to address these limitations.

Nanoscale powders of various compositions can be produced using different methods. Some illustrative but not exhaustive lists of manufacturing methods include precipitation, hydrothermal processing, combustion, arcing, template synthesis, milling, sputtering and thermal plasma. Often, although not always, nanoscale powders produced by such manufacturing methods lead to powders that do meet all the requirements of an end user application. For example, some of the issues limiting the broad use of nanopowders include, 1. Nanoparticles tend to form agglomerates that in some ways behave like larger particles; there is a need for post-processing technologies that can recover the nanoparticles from such agglomerates 2. Nanoparticles tend to aggregate thereby making it relatively difficult to disperse them; there is a need for post-processing technologies that can enable ease in the formation of nanoparticulate dispersions in aqueous and non-aqueous solvents 3. Nanoparticles offer unusual combination of properties; however sometimes they are not used because they are not satisfactory in at least one of the matrix of performance desired for the application; there is a need for post-processing technologies that can enable improvement in the unsatisfactory performance at an affordable cost 4. Nanoparticles tend to adsorb significant levels of gases over their high surface areas; alternatively, the surface of nanoparticles are of a form that makes them incompatible with preferred solvents in specific applications; there is a need for post-processing technologies that can enable improvement in the surface state of nanoparticles to overcome these limitations 5. Nanoparticles tend to require very high pressures for compaction into products. This is in part because of agglomeration and/or high internal friction. Although such high pressures can be used to consolidate nanoscale powders, this technique is often limited to the preparation of thin sections due to very high internal residual stresses. Post-processing techniques are needed that can readily form nanostructured products.

6. Nanoparticles are difficult to process into components because of their unusual rheological and other properties. Post-processing techniques are needed that can enable reliable, reproducible, and affordable processing of nanopowders into components.

Hence, a variety of needs exist for techniques for improving selected features of sub-micron powders, and specifically nanopowders, to improve the performance of these materials in known applications, and to open up new applications that, until now, were impractical or impossible.

SUMMARY OF THE INVENTION

Briefly stated, the present invention involves the post-processing of nanoscale powders of oxides, carbides, nitrides, borides, chalcogenides, metals, and alloys are described. The powders are post-processed to improve their functional and processing characteristics thereby enabling their widespread use in commercial applications. Fine powders discussed are of size less than 100 microns, preferably less than 10 micron, more preferably less than 1 micron, and most preferably less than 100 nanometers. Methods for producing such post-processed powders in high volume, low-cost, and reproducible quality are also outlined.

DETAILED DESCRIPTION OF THE PREFERRED EMBODIMENTS

The present invention is directed generally at systems and methods for post-processing of nanoscale powders to alter and improve their functional and processing characteristics to more usefully address the needs of various applications for the post-processed powders. In particular, examples are given of post-processing techniques that address agglomeration and aggregation, improve one or more physical, chemical, or solid state properties of the powders, and improve or simplify the subsequent use of the powders in various applications and devices. However, the applications of the teachings of the present invention are in many cases broader than the specific techniques and systems taught herein. Accordingly, the basic teachings are readily modified and adapted to encompass such changes unless specifically taught otherwise.

To ease understanding of various techniques and concepts taught herein, the following definitions are used in the present specification, although the art recognizes various terms not used herein with similar definitions, and may define specific words and terms used herein with more general or more specific meanings:

DEFINITIONS

Fine powders, as the term used herein, are powders that simultaneously satisfy the following:

1. particles with mean size less than 100 microns, preferably less than 10 microns, and 2. particles with aspect ratio between 1 and 1,000,000.

Submicron powders, as the term used herein, are fine powders that simultaneously satisfy the following:

1. particles with mean size less than 1 micron, and 2. particles with aspect ratio between 1 and 1,000,000.

Nanopowders (or nanosize powders or nanoscale powders or nanoparticles), as the term used herein, are fine powders that simultaneously satisfy the following:

1. particles with mean size less than 250 nanometers, preferably less than 100 nanometers, and 2. particles with aspect ratio between 1 and 1,000,000.

Pure powders, as the term used herein, are powders that have composition purity of at least 99.9%, preferably 99.99% by metal basis.

Powder, as the term used herein encompasses oxides, carbides, nitrides, chalcogenides, metals, alloys, and combinations thereof. The term includes hollow, dense, porous, semi-porous, coated, uncoated, layered, laminated, simple, complex, dendritic, inorganic, organic, elemental, non-elemental, composite, doped, undoped, spherical, non-spherical, surface functionalized, surface non-functionalized, stoichiometric, and non-stoichiometric form or substance.

To practice the teachings herein, nanoparticles and submicron particles can be produced by any technique. The preferred techniques included herein and identified by reference to other patents and patent applications are provided as examples to ease understanding and implementation of the invention.

Figure 1:
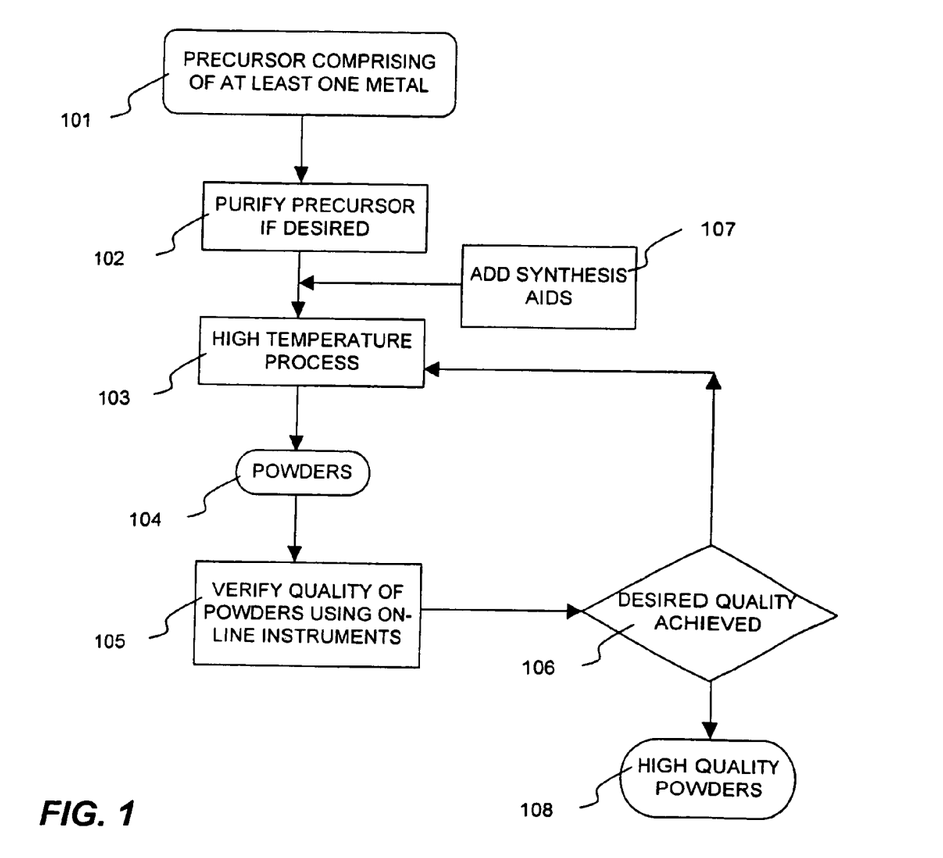
FIG. 1 shows a schematic block diagram of a process for the continuous synthesis of nanoscale powders in accordance with the present invention.

A preferred technique for the present invention is to prepare nanoscale powders environmentally benign, safe, readily available, high metal loading, lower cost fluid precursors as shown generally in FIG. 1. The precursor used in operation 101 may be a gas, sol, single-phase liquid, multiphase liquid, a melt, fluid mixtures and combinations thereof. Illustration of precursors includes but does not limit to metal acetates, metal carboxylates, metal ethanoates, metal alkoxides, metal octoates, metal chelates, metallo-organic compounds, metal halides, metal azides, metal nitrates, metal sulfates, metal hydroxides, metal salts soluble in organics or water, metal containing emulsions. Multiple metal precursors may be mixed if complex powders are desired.

Optionally, precursor 101 is purified by any available technique. Whether a precursor 101 benefits from purification is application dependent, and dependent on the original purity of the precursor 101. Another optional, application-specific operation is shown by the addition of synthesis aids in 107. Synthesis aids may be used to affect physical, chemical, or solid state properties of the powder produced. Synthesis aids 107 may also act as catalysts or buffers in the process of producing powders.

In the preferred technique, once the desired precursor is available, it is processed at high temperatures in 103 to form the powder 104. Products such as powders 104 produced from these precursors are pure (i.e., having a high degree of homogeneity of one or more desired properties such as particle size, particle composition, stoichiometry, particle shape, and the like). It is important that the method of producing the product and the environment in which these products are produced are pure and compatible with the chemistry involved.

The high temperature processing is conducted at step 103 at temperatures greater than 1000 K, preferably 2000 K, more preferably greater than 3000 K, and most preferably greater than 4000 K. Such temperatures may be achieved by any method such as, but not limited to, plasma processes, combustion, pyrolysis, electrical arcing in an appropriate reactor. The plasma may provide reaction gases or just provide a clean source of heat. A preferred embodiment is to atomize and spray the feed in a manner that enhances heat transfer efficiency, mass transfer efficiency, momentum transfer efficiency, and reaction efficiency. Method and equipment such as those taught in U.S. Pat. Nos. 5,788,738; 5,851,507 and 5,984,997 (and which are herewith incorporated by reference) are illustrations of various ways the teachings herein can be practiced.

In the preferred embodiment, the high temperature processing method includes instrumentation that can assist the quality control. Furthermore it is preferred that the process is operated to produce fine powders 104, preferably submicron powders, and most preferably nanopowders. The gaseous products from the process may be monitored for composition, temperature and other variables to ensure quality at 105. The gaseous products may be recycled at step 106 or used as a valuable raw material when the powders 108 have been formed as determined at step 106 in an integrated manufacturing operation.

Once the product fine powders 108 have been formed, it is preferred that they be quenched to lower temperatures to prevent agglomeration or grain growth such as, but not limited to, methods taught in the U.S. Pat. No. 5,788,738. It is preferred that methods be employed that can prevent deposition of the powders on the conveying walls. These methods may include electrostatic, blanketing with gases, higher flow rates, mechanical means, chemical means, electrochemical means, or sonication/vibration of the walls.

The product fine powders may be collected by any method. Some illustrative approaches without limiting the scope of this invention are bag filtration, electrostatic separation, membrane filtration, cyclones, impact filtration, centrifugation, hydrocyclones, thermophoresis, magnetic separation, and combinations thereof.

Figure 2:
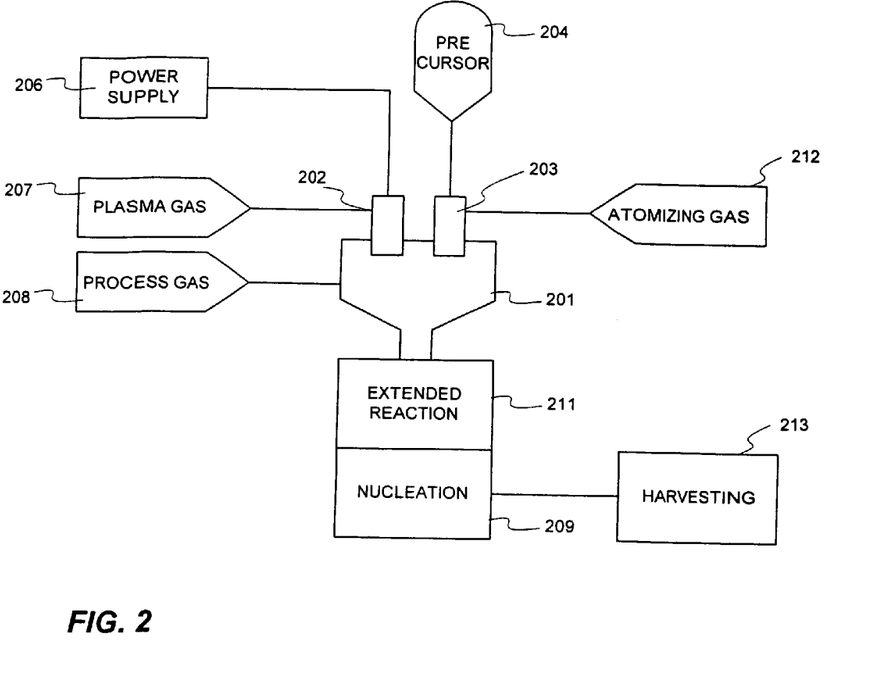
FIG. 2 shows an exemplary overall approach for producing submicron or nanoscale powders in accordance with the present invention.

FIG. 2 shows a schematic diagram of a thermal process for the synthesis of nanoscale powders as applied to precursors such as metal containing emulsions, fluid, or water soluble salt. Although a single precursor storage tank 204 is shown in FIG. 2, it should be understood that multiple precursor tanks 204 may be provided and used with or without premixing mechanisms (not shown) to premix multiple precursors before feeding into reactor 201. A feed stream of a precursor material is atomized in mixing apparatus 203. The precursor storage 204 may alternatively be implemented by suspending the precursor in a gas, preferably in a continuous operation, using fluidized beds, spouting beds, hoppers, or combinations thereof, as best suited to the nature of the precursor. The resulting suspension is advantageously preheated in a heat exchanger (not shown) preferably with the exhaust heat and then is fed into thermal reactor 201 where the atomized precursors are partially or, preferably, completely transformed into vapor form.

The source of thermal energy in the preferred embodiments is a combination of heat of reaction in series with a plasma generator 202 powered by power supply 206. Plasma gas 207, which may be inert or reactive, is supplied to plasma generator 202 along with any other desired process gas 208. Alternatively, the source of thermal energy may be internal energy, heat of reaction, conductive, convective, radiative, inductive, microwave, electromagnetic, direct or pulsed electric arc, nuclear, or combinations thereof, so long as sufficient to cause the rapid vaporization of the powder suspension being processed.

In preferred embodiment, the atomized feed first combusts to form a hot vapor and it is this hot vapor that interacts with the plasma; in this embodiment, the feed is not directly injected into the plasma. Optionally, in order to prevent contamination of the vapor stream caused by partial sublimation or vaporization, the walls of reactor 201 may be pre-coated with the same material being processed.

The vapor next enters an extended reaction zone 211 of the thermal reactor that provides additional residence time, as needed to complete the processing of the feed material and to provide additional reaction and forming time for the vapor (if necessary). As the stream leaves the reactor, it passes through a zone 209 where the thermokinetic conditions favor the nucleation of solid powders from the vaporized precursor. These conditions are determined by calculating the supersaturation ratio and critical cluster size required to initiate nucleation. Rapid quenching and highly concentrated feeds lead to high supersaturation which gives rise to homogeneous nucleation. The zones 201, 211, and 209 may be combined and integrated in any manner to enhance material, energy, momentum, and/or reaction efficiency.

As soon as the vapor has begun nucleation to form nanoscale clusters, the process stream is quenched in an apparatus within nucleation zone 209 to prevent the products from growing or sintering or reaching equilibrium. The quench apparatus may comprise, for example, a converging-diverging nozzle-driven adiabatic expansion chamber at rates at least exceeding 1,000 K/sec, preferably greater than 1,000,000 K/sec, or as high as possible. A cooling medium (not shown) may be utilized for the converging-diverging nozzle to prevent contamination of the product and damage to the expansion chamber. Furthermore, near-sonic velocities or supersonic velocities may be employed to prevent collisions between the nanoscale particles. Rapid quenching with high velocities ensures that the powder produced is homogeneous in composition, its size is uniform, it is free flowing and the mean powder size remains in submicron scale.

The quenched gas stream is filtered in appropriate separation equipment in harvesting region 213 to remove the submicron powder product 308 from the gas stream. As well understood in the art, the filtration can be accomplished by single stage or multistage impingement filters, electrostatic filters, screen filters, fabric filters, cyclones, scrubbers, magnetic filters, or combinations thereof. The filtered nanopowder product is then harvested from the filter either in batch mode or continuously and then transported using screw conveyors or gas-phase solid transport or other methods known in the art. The powder product stream is conveyed to post-processing unit operations discussed below.

The purpose of post-processing is to enhance the performance or processability of a nanopowder, which may be produced by any synthetic process, into a product at an affordable cost. Some of these post-processing techniques are discussed below. These post-processing steps may be done alone or in combination in any order. Quality control techniques and distributed instrumentation network may be employed at any stage to enhance the performance of nanoscale powders manufactured.

Figure 3:
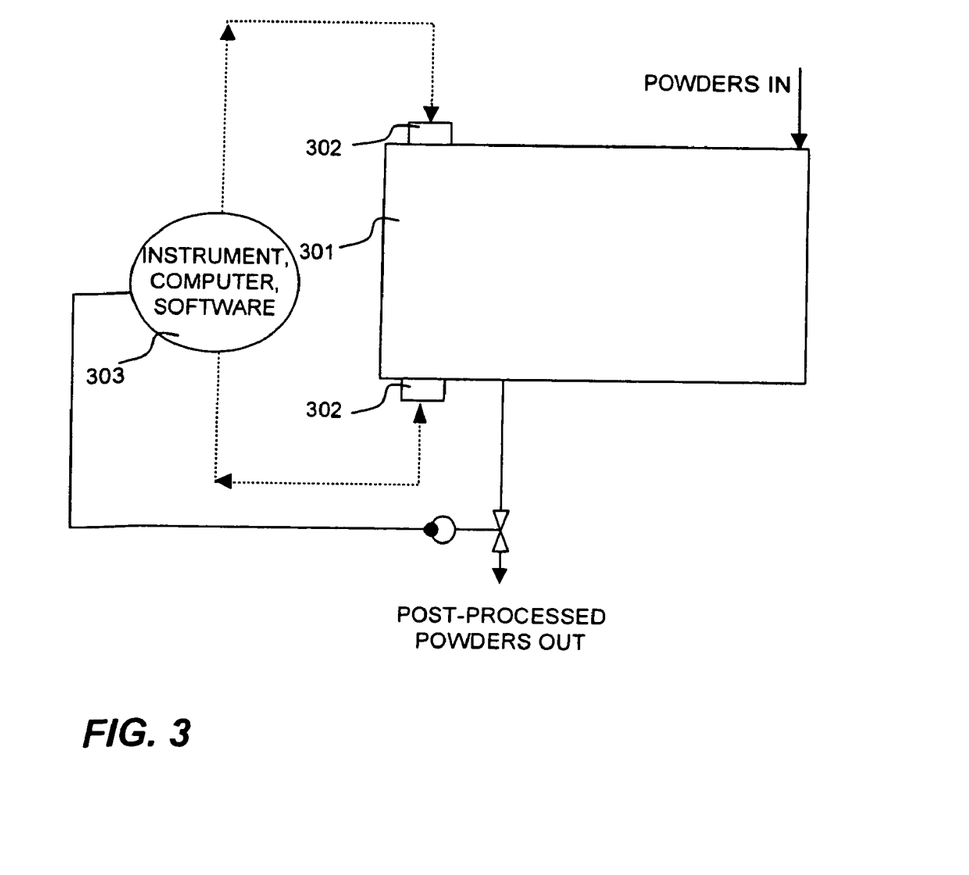
FIG. 3 shows an exemplary overall approach for improving the quality of submicron and nanoscale powders produced in accordance with the present invention.

FIG. 3 depicts exemplary equipment that can be used for post-processing. The powders to be post-processed are delivered into a post processing equipment 301. One or more instrument ports such as 302 interfaces a powder quality measurement system to the chamber 301 and to one or more instruments 303. The instruments 303 implement methods to measure powder quality, a computer, and a software to control the post processing step. Some non-limiting illustration of instruments 303 include X-ray diffractometer, surface area instrument, laser or light scattering, photo-correlation spectroscopy, angle of repose measurement instrument, imaging instrument, zeta potential instrument, acoustic analysis instrument, and others. The instrument 303 monitors the quality of the powders as post-processing progresses and evolves or stops the post-processing profile in accordance with software settings. This technique can ensure the quality and consistency of the powders produced.

In a preferred embodiment, the instrument 303 comprises a system capable of producing an electromagnetic feed signal. This feed signal interacts with the nanoscale particles being processed in chamber 301. The feed signal after interacting with the particles creates one or more product signals because of scattering, reflection, diffraction, emission, refraction, transmission, absorption, impedance, or a combination of these effects. One or more of these product signals are then received by receiving part of instrument 303. A resident software installed on a computing platform then interprets the product signal, mathematically transforms it into a numeric quantity if appropriate, compares the numeric quantity with calibrated responses resident in the instrument, and determines the particle quality at specific time and space. To illustrate, but not limit, the product signal transformation step can utilize Scherrer analysis of peak broadening detected in a diffraction pattern of electromagnetic waves at specific wavelengths. In some cases, just the peak broadening (or product signal generated) at a specific wavelength may be a sufficient and convenient way for real-time quality control. In other cases, a reference sample may be employed and the signal from chamber 301 may be compared against the reference sample to determine the deviation from the reference sample. When particles are dispersed in a fluid media, lasers may be the preferred electromagnetic feed signal. In yet other cases, sound or ultrasonic waves may be employed instead of or with electromagnetic waves to establish the powder quality. Finally, it should be noted that such in-situ quality control techniques could be employed during nanoscale powder synthesis or post-processing (e.g., in process 106 shown in FIG. 1).

Figure 4:
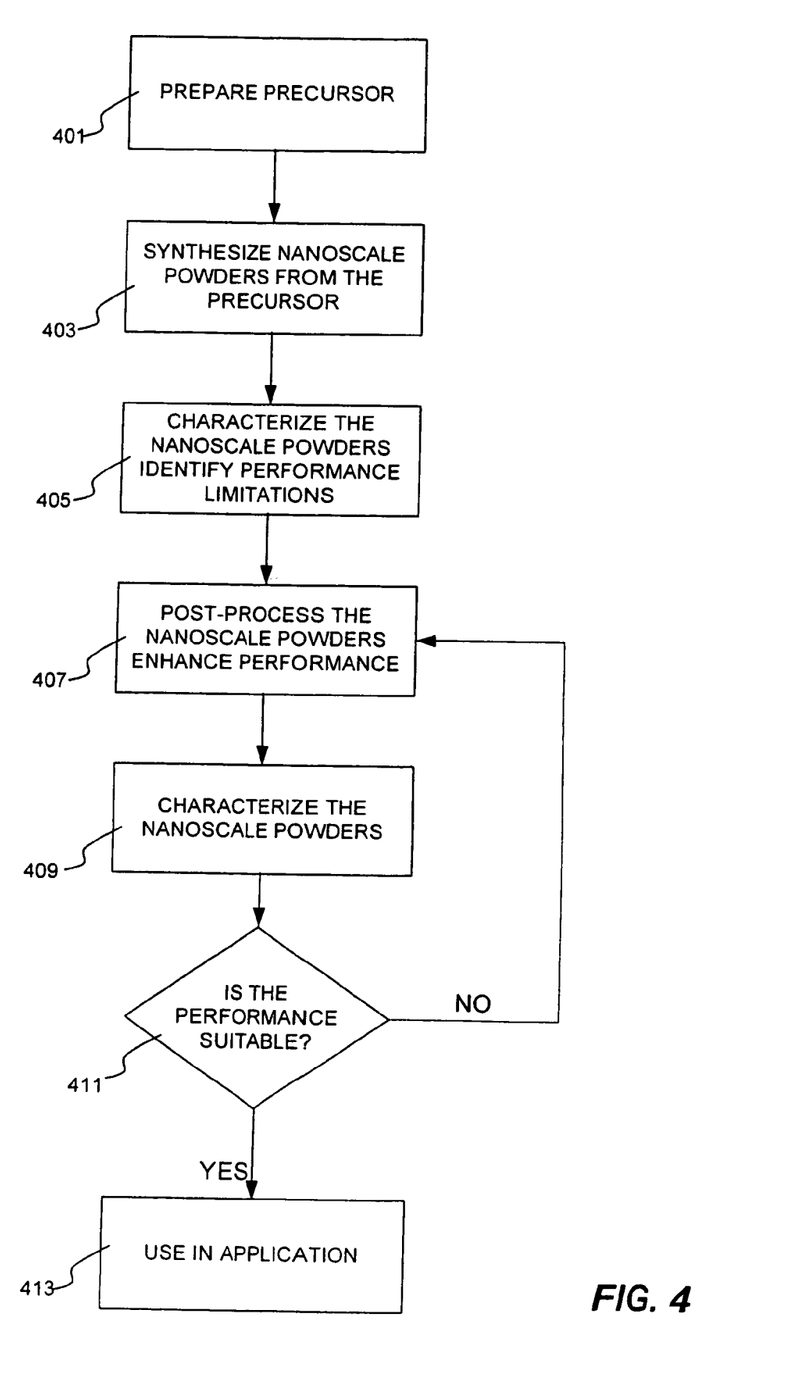
FIG. 4 shows an exemplary overall approach for post-processed powders into a part or component in accordance with the present invention.

FIG. 4 illustrates in flow diagram form a generalized process for producing post-processed powders that encompasses the various specific examples provided herein. The operations shown in FIG. 4 are preferably performed in a continuous manufacturing process, however, it is contemplated that powder production may be performed as a separate process from the post-processing operations.

Operations 401 and 402 describe generally operations relating to the initial manufacture of nanoscale powders, such as by the more specific operations described in reference to FIG. 1. At 405, the nanoscale powders are characterized to identify performance limitations. Operation 405 typically involves identifying characteristics that are undesirable in a particular application. For example, some applications may tolerate agglomeration, but nevertheless benefit from altering the phase or surface composition of the powder. Characterization 405 focuses on specific characteristics desired by an application.

In operation 407, and appropriate post-processing regimen is selected based upon the characterization 405 and the desired characteristics of an application. In each specific example below, post-processing operation 407 is performed to affect the powder in a particular way. Multiple post-processing operations 407 may be performed to alter multiple characteristics. After powders have been post processed, operation 409, which is similar to operation 405, characterizes the powder attributes to determine whether characteristics satisfy desired application characteristics. If not, additional post processing can be performed by returning to operation 407. Otherwise the post-processed powder, can be used in the desired application at 409.

1. Modify the Degree of Agglomeration

Nanopowders tend to form agglomerates. These agglomerates tend to adversely affect further processing of nanopowders into useful nanostructured components. One aspect of the invention involves technologies that can prevent and/or address the problem of agglomerate formation. As discussed above, appropriate synthesis can impact the formation of free-flowing nanoscale powders, particle collisions at high temperatures, and degree of agglomeration. In case nanoscale powders have undesirable degree of agglomeration, this can be addressed by post-processing in many cases.

Agglomerates may be of several types. Soft agglomerates are those where the neighboring particles forming the agglomerate are weakly attached. Hard agglomerates are those where the neighboring particles forming the agglomerate are sintered to some extent with their neighbors at their grain boundaries; such sintering leads to strong chemical bonds between the particles.

Soft agglomerates can be broken down into independent particles by providing shear forces, or other type of stress, such as those in a ball mill, or jet mill, or other types of mill, or sonication, or impaction of particles on some surface. Other methods that can provide shear or stress can be utilized. It is important that the temperature of the particles during de-agglomeration be kept below a temperature where sintering begins. It is suggested that the post-processing of soft agglomerates be preferably done at temperatures below 0.5 times the melting point of the substance in Kelvin, more preferably below 0.35 times the melting point, and most preferably below 0.25 times the melting point. If necessary, external cooling or cryogenic cooling may be employed.

In another embodiment, the milling environment is grounded as nanoparticles tend to develop static charge. In yet another preferred embodiment, the milling environment is provided with a fluids such as but not limiting to organic acid vapors or liquids, alcohols, aldehydes, ketones, aromatics, monomers, amines, and imines. Such an environment pacifies the surfaces and prevents reformation of soft agglomerates once the milling stops.

Hard agglomerates can be post-processed by techniques disclosed for soft agglomerates above. However, the energy required for separating sintered particles is often significant. Therefore, a preferred method is to provide a reactive media that can assist separation of the hard agglomerates into independent particles. In a preferred embodiment, a solvent that dissolves the substance being processed is used as the reactive media. Preferably, the reactive media tends to dissolve the sintered interfaces (necks) preferentially and thereby accelerates stress-induced separation of the particles. The reactive media should be selected such that it does not dissolve the particulates completely. It should be noted that such post-processing will lead to dissolution of the substance into the media which in turn will change the state of the media. It is therefore preferred that the post-processing medium be monitored and refreshed thereby maintaining the preferred environment. To illustrate but not limit, alumina nanoparticles are known to dissolve in highly alkaline solutions. Thus, hard agglomerates comprising alumina nanoparticles can be post-processed in a mill and an alkaline medium. The alkaline media is expected to assist the milling process. However, as alumina dissolves, it is expected that the pH of the medium will change. It is preferred that the media be refreshed, by replacement or recycle or addition, to a pH that provides desired post-processing performance.

During the post-processing of hard agglomerates, in another preferred embodiment, the milling environment is provided with appropriate and compatible surface adhering fluids such as but not limiting to organic acids, alcohols, aldehydes, ketones, aromatics, dispersants, monomers, amines, and imines. Such an environment pacifies the surfaces and prevents formation of agglomerates once the milling stops.

In summary, according to this aspect of the invention, the generic method for post-processing agglomerated submicron or nanoscale powders comprises: (a) synthesizing the powders; (b) determining the nature of agglomerates; (c) transferring the said agglomerated powders into an equipment; (d) applying shear or other stress to the agglomerated powders, commensurate with the determined nature of agglomerate, while maintaining the average temperature less than 0.5 times the melting point of the powder in Kelvin for a period sufficient to break the agglomerated powder into de-agglomerated powder; (e) collecting the de-agglomerated powder. This method can further comprise adding a reactive media or a surface adhering fluids or both before the shear step.

2. Modify the Surface

One of the features of nanoparticles is their high surface area. This surface often is covered with functional groups or adsorbed gases or both. This can cause difficulty in processing the powders into a finished product. In some applications, it is necessary that the surface be modified to simplify product manufacturing and to improve the consistency and reliability of the finished product.

Commonly owned U.S. Pat. No. 6,228,904, incorporated herein by reference, teaches several methods for modifying the surface of sub-micron and nanoscale powders. Surface modification can be accomplished in a number of ways. The surface modification may include one or more of the following steps: (a) the water content on the powder surface is brought to a desired value followed by a wash of the surface with hydrolyzing species (such as but not limiting to organometallics, alkoxides) thereby functionalizing the surface of the powders; (b) the powder is heated in vacuum to remove adsorbed species; thereafter the powder is treated to species of choice to cover its surface area; (c) the powder is first washed with an organic acid (such as but not limiting to oxalic acid, picric acid, acetic acid) which is then followed by a treatment with surface stabilizing species such as but not limited to nitrogen containing organic compounds, oxygen containing organic compounds, oxygen and nitrogen containing organic compounds, chalcogenides containing organic compounds, polyalkylimines, polyalkeneimines, and quarternary ammonium species; (d) the powder surface is reduced or oxidized selectively to form a thin, preferably a monolayer, of functionalized surface. In these methods, the volume, fraction of the species or substance that is functionalizing the surface is preferably given by:

$$\gamma_s < 1/(d_p/3+1)$$

Where, $\gamma_s$ is the volume fraction of the species that is functionalizing the nanomaterial surface and $d_p$ is the average domain size of the nanomaterial in nanometers. While the above equation is the preferred guideline, higher volume fractions may be utilized for certain applications. The motivation for these and other surface modification post-processing steps is to produce an interface that makes the nanoscale powders easier to process or easier to include as a constituent in the final product while retaining the benefits of nanoscale dimensions in the final product.

As a particular example, nanoscale silica particles can be surface treated with organosilicon compounds. For example, hexamethyldisilazane is used to make silica surface hydrophobic. The hydrophobicity results from the treatment with hexamethyldisilazane, which replaces many of the surface hydroxyl groups on the silica nanoparticles with trimethylsilyl groups. One aspect of the present invention involves the selection of the composition of the species chosen to treat the surface of a nanopowder in a manner that enhances the performance of the treated powder. While the prior art methods can be utilized for the purposes and motivations outlined in this specification, it is preferred that the composition of the species that is functionalizing the nanomaterial surface be chosen to enhance the performance of the treated powder. In majority of cases, a non-silicon composition is anticipated to be preferred for surface treatment.

3. Modify the Near-Surface Composition

As mentioned above, one of the features of nanoparticles is their high interface area. The performance of a nanostructured product prepared from nanoscale powders is therefore strongly affected by the performance of the interface. Some non-limiting illustrations of interface influence on the performance of a nanostructured product includes the high interface diffusivity, electrochemical properties, phonon pinning, catalytic properties, optical properties, and size-confined electrical and thermoelectronic properties. A post-processing step that can modify the interface composition can significantly impact the performance of the product that comprises such nanoscale powders.

One method for modifying the near-surface composition is to partially reduce the composition. For example, an oxide nanopowders if treated with hydrogen or ammonia or carbon monoxide or methanol vapors at moderate temperatures for a pre-determined, time can lead to a powder composition where surface of the nanopowder is deficient in oxygen while the bulk retains full stoichiometry. Similarly, if the nanoscale powder is treated with methane in the presence of carbon, the surface of the nanopowder can be transformed into an oxycarbide or carbide, while the core of the particle remains an oxide. Alternatively, carbothermic nitriding conditions can be used to produce nitride rich surface composition. It is important that carbothermic nitriding be done in the presence of a stoichiometrically excess of carbon to prevent excessive coarsening and sintering of the particles. Boron rich surface compositions can be achieved by carbothermic reduction in presence of borane or other boron containing compounds. It should be noted that there is no need to completely change the composition of the nanoscale powder. The benefits of improved performance can be achieved by forming a nanoscale powder with a composition gradient, i.e., where the surface is of one desired composition (stoichiometric or non-stoichiometric), the core of the particle is of another desired composition (stoichiometric or non-stoichiometric), and the particle's composition transitions from the core to that at the surface.

Yet another embodiment of the current invention is to use mechanically fused coatings on submicron or nanoscale powders to change the surface composition. This approach essentially involves high shear mixing where the shear energy is high enough to fuse one composition on the surface of the other. This approach can significantly impact the flowability, angle of repose, shape, physical and chemical property of the composite particle. Furthermore, this approach can produce powders with characteristics that are not achievable by either of the powders alone or by a simple non-fused blend of the powders.

Yet another embodiment of the current invention is to coat the submicron or nanoscale powders with another material followed by heat treating the particle to induce chemical reaction(s) that change the surface composition. This process, for illustration, can comprise (a) coating submicron or nanoscale particles with an organic or inorganic or metallorganic substance, (b) placing the particles in an equipment where the said powders can be heated in an environment of desired pressure, temperature, and gas composition, (c) heating the particles through a linear or non-linear temperature profile, (d) holding the particles at desired temperatures for a suitable length of time, (e) cooling the particles to room temperature, and (f) removing the particles from the equipment and using it in a suitable application. These steps can further comprise steps where suitable instruments are employed to monitor and control the feed, or process, or products, or a combination of these. It is expected that such heat treated of coated particles can modify the near-surface composition of the particles and therefore their performance.

4. Modify the Phase

Post-processing can be used to modify the phase of nanoparticles. The phase of the particle affects its performance and such post-processing can therefore be useful. For example, thermal treatment (cryogenic or high temperature) of an oxide can be used to change an orthorhombic or triclinic or monoclinic phase to cubic phase. Alternatively, anatase phase can be changed to rutile phase or reverse. Pressure can be combined with thermal treatment to achieve phase change.

Another embodiment of this invention is to use electrical current to modify the phase of the material. While not exclusively limited to conducting materials, electrical transformation can be particularly suitable in conducting materials (oxides, non-stoichiometric materials, non-oxides) since electrical current can also provide nominal levels of ohmic heating. Similarly magnetic field can be used to modify the phase of a material.

5. Modify the Surface Area of the Particles

One of the motivating factors for using nanoparticles is their unique surface area. Often, the surface area of the powder is dependent on the processing method and processing conditions used to produce the powders. Techniques that can enhance the surface area of a low surface area powder can make the powder more desirable in certain applications. This is often difficult to do.

In one embodiment aiming to engineer the particle surface area, the particles are produced with another sacrificial compound that retains its identity. The sacrificial compound is then removed by extraction or dissolution into a suitable medium. For example, zinc oxide can be co-synthesized with zirconium oxide followed by dissolution of zinc oxide in a medium of suitable pH. The zinc oxide can be recycled to reduce the cost of the nanoparticle manufacture. This process, in more generic sense, can be described as a method for increasing the surface of submicron or nanoscale particles comprising (a) mixing the precursor for submicron or nanoscale particles desired with a precursor of sacrificial composition, (b) synthesizing and collecting the particles as a composite of the desired particle composition and the sacrificial composition, (c) extracting the sacrificial composition using a suitable solvent from the composite particle to achieve the desired surface area, (d) if desired, washing the particles to remove traces of solvent, and (e) if desired, further post-processing the particles to meet customer requirements. Some illustrations of such sacrificial compositions include zinc oxide, magnesium oxide, calcium oxide, alkaline metal oxides, tin oxide, antimony oxide, indium oxide, multi-metal oxides, chalcogenides, halides, and water soluble salts.

In another embodiment, the particles of desired composition are produced with another sacrificial metal or alloy that retains its identity in the composite particle. The sacrificial metal or alloy is then selectively removed by extraction or dissolution into a suitable medium as explained above. Some illustrations of such sacrificial compositions include transition metals, semi-metals, and various alloys.

In some cases, it is possible that the particles of desired composition may by themselves be soluble in a solvent. In these cases, the surface area of the particles can be modified by direct dissolution in a suitable solvent for appropriate period of time. In yet another embodiment, the submicron or nanoscale particles may be milled in a solvent to modify the surface area or other characteristics of the particles. It all cases, it is preferred that the solvent used for dissolution process is replenished to maintain the best dissolution kinetics. The replenishment can be achieved by removing, recovering and recycling the solvent. It is also preferred that the dissolution process conditions such as temperature and mixing rates are engineered and instrumented for high productivity.

In another embodiment, instead of using a sacrificial composition that can be removed using a solvent, a sacrificial composition that can be removed by sublimation may be preferred. For this embodiment, compounds or metals or alloys with high vapor pressures at moderate temperatures, such as less than 975K, are preferred. In this embodiment, vacuum may be employed to reduce the time needed to sublime the sacrificial composition.

6. Modify the Shape

One of the desirable features in particle technology is the ability to control particle shape. Quite often, the shape of very small particles is spherical. However, a number of applications prefer particles with an aspect ratio greater than 1.5, more preferably greater than 3.0, and even more preferably greater than 10.0. Techniques that can modify the shape of a particle can also enhance the surface area of a powder.

One post-processing technique for modifying shape is catalytic transformation. This process, in more generic sense, can be described as a method for modifying the shape of submicron or nanoscale particles comprising (a) mixing the submicron or nanoscale particles or their precursors with a catalyst that preferentially favors dissolution and precipitation of the particles, (b) processing the mixture at a temperature greater than 300K, preferably greater than 1000K (c) collecting the particles with desired aspect ratio, and (d) if desired, further post-processing the particles to meet customer requirements. In this embodiment, the catalytic reactions are preferably conducted in a gas phase.

Another post-processing technique for modifying shape is the use of shear at temperatures where the material softens. As a rule of thumb, this temperature for many composition is between $0.2*T_m$ and $0.95*T_m$, where $T_m$ is the melting point of the composition in Kelvin.

Yet another post-processing technique for modifying shape is to mix the particles in a polymer followed by thermal treatment of the mix. The thermal treatment is anticipated to cause sintering and growth of the particle into particle shapes of desired aspect ratio. Techniques such as extrusion may be employed before the thermal treatment to control the aspect ratio of the particles.

Still another post-processing technique for modifying shape is to deposit the submicron or nanoscale particles in a template followed by thermal treatment between $0.2*T_m$ and $0.95 T_m$, where $T_m$ is the melting point of the composition in Kelvin. Illustrative templates include anodized aluminum, anodized silicon, other anodized metals, micro-machined templates, porous polymers, radiation templated polymers, zeolites, emulsion produced templates, and other templates.

The template can be removed using solvents and other techniques after the desired aspect ratio particles have been produced.

7. Post-Processing of Nanopowders to Achieve Consolidation

Once the nanoscale powders have been post-processed, they may be transformed into a useful product. For example, coatings, casting, molding, compacting, spraying, pressing, electrodeposition, and other techniques followed by thermal treatment for consolidation and sintering are exemplary techniques for manufacturing or forming useful products from post-processed powders in accordance with the present invention.

One illustrative method is carefully controlled slurry processing. Briefly, the slurry process entails the dispersion of powders in a liquid medium that contains a solvent, as well as organic constituents added to tailor the rheological properties of the dispersion and the mechanical properties of the product after the solvent is removed by drying. The solvent can be aqueous or non-aqueous; many slip systems are formulated with organic solvents including alcohols, ketones, and hydrocarbons. Dispersants are an important additive since they prevent agglomeration and coagulation of the powders in suspension. Dispersion can be facilitated by steric repulsion, meaning adsorbed molecules physically interfere with those of other particles, or electrostatic repulsion, which employs the repulsive nature of particles with a similar surface charge. Commonly employed chemical dispersants are carboxylic acids and phosphate esters for solvent-based systems. In practice, most systems are stabilized by a combination of electrostatic and steric mechanisms.

Dispersing nanopowder slurries is not a trivial process. Agglomeration in slip systems causes problems similar to those that occur as a result of agglomeration in dry pressing. In this case, however, the agglomerates can be broken by the application of aggressive forces during processing. Exemplary methods that can be utilized are ball milling, high power ultrasonic agitation, or shear homogenization. Applying these processes to powder suspensions can lead to a green body (i.e., unfired) with a very high density (i.e., >65%); this body, in turn can be sintered to near theoretical density.

Figure 5:
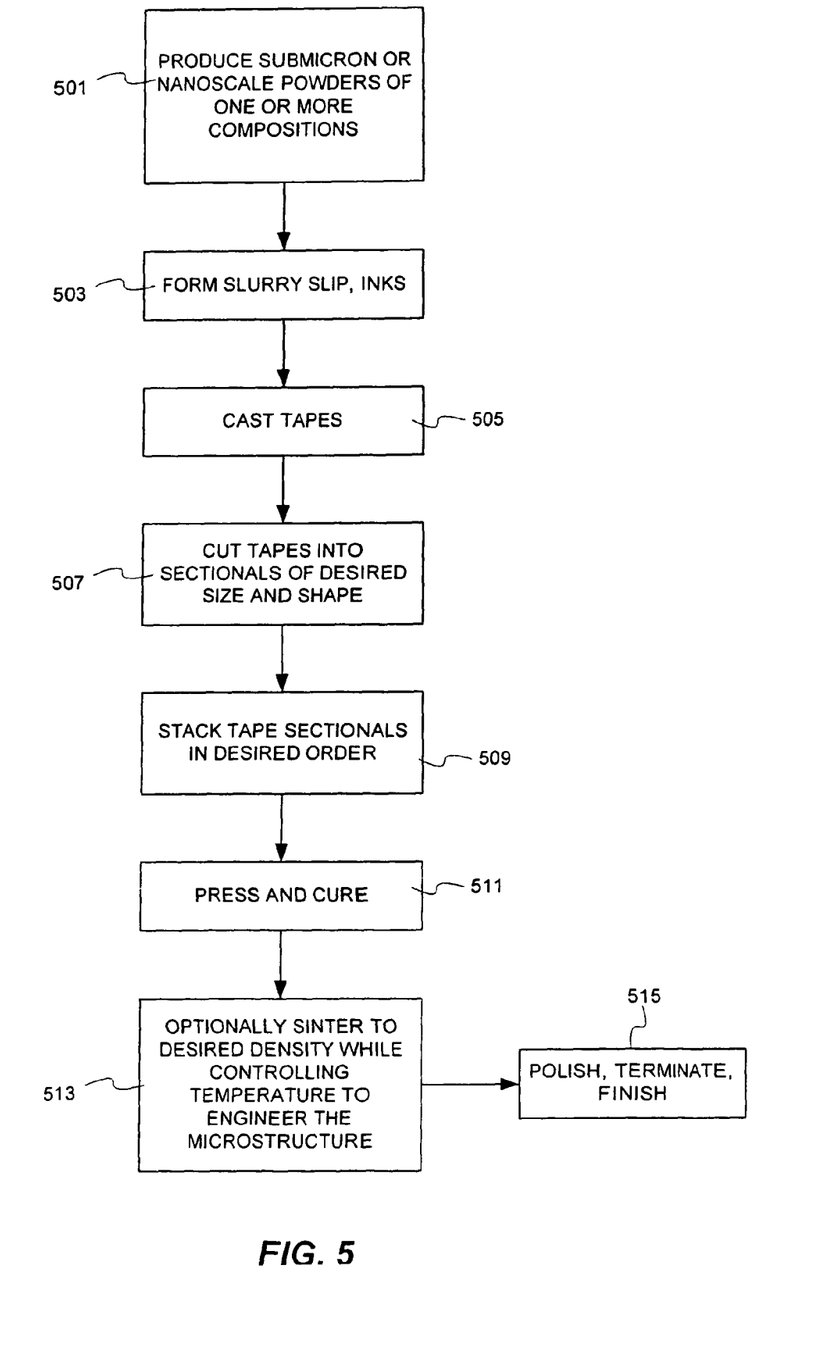
FIG. 5 shows an exemplary process for producing a product or device from nanoscale powders produced in accordance with the present invention.

FIG. 5 illustrates this aspect of the disclosed invention schematically. The details of the invention are as follows:

A. Nanocrystalline ceramic powder produced in 501 and is formulated into a slurry, slip or ink in 503. An illustration of preferred embodiment, but in no way limiting the scope of this invention, is as follows: 10 vol. % nanocrystalline SiC powder, a cationic dispersant in the level 2 mg/m$^2$, a polymeric binder, and toluene are ball-milled with zirconia media in a polyethylene bottle for 12 hours.

B. The slip is tape-cast in 505 into a layer, preferably 0.1 to 1000 microns thick, more preferably that is 1 to 100 microns thick, and most preferably that is 5-50 microns thick.

C. Multiple sheets or layers produced in 505 are stacked to yield the desired thickness, and the layers are laminated together.

D. The laminated layers are sectioned in 507 to yield the appropriate component geometry. In operations 509 and 511, the sectionals can be stacked in a desired order, and pressed and cured to form a working structure.

E. The component is placed in a furnace and sintered in operation 513, when appropriate, to full density (e.g., 1400° C. for zirconia). Operation 513 yields a device, part or component that can then be processed through various finishing operations 515 such as polishing, terminating, electroding, passivating, packaging, or other device-specific processes.

Distinctive features of this invention relate to the quality of the final product and the low-cost and flexibility of the processing. Using multiple tape cast layers allows layers to be formed in a wide variety of shapes and sizes using inexpensive and efficient equipment. Active layers (i.e., layers comprising materials designed to perform a specific device function) can be intermixed with non-active layers that provide structural support, electrical or mechanical connectivity, and other supporting functions. Stacking tape cast layers into laminate structures allows control over device shape in three-dimensions. A differentiating factor of the proposed invention, over prior art, is the benefit of a nanocrystalline structure in the finished product.

The advantages of nanomaterials such as increased hardness and wear-resistance, novel electrical properties, electrochemical properties, chemical, thermal, magnetic, thermoelectric, sensing, optical, electro-optical, display, energetic, catalytic, and biological properties will benefit many engineering applications.

Possible compositions of the active layer include but are not limited to organic, inorganic, metallic, alloy, ceramic, conducting polymer, non-conducting polymer, ion conducting, non-metallic, ceramic-ceramic composite, ceramic-polymer composite, ceramic-metal composite, metal-polymer composite, polymer-polymer composite, metal-metal composite, processed materials including paper and fibers, and natural materials such as mica, dielectrics, ferrites, stoichiometric, non-stoichiometric, or a combination of one or more of these. Illustrative compositions include but are not limited to doped or undoped, stoichiometric or non-stoichiometric titanium oxide, barium titanate, strontium titanate, zinc oxide, zinc sulfide, indium oxide, zirconium oxide, tin oxide, antimony oxide, tungsten oxide, molybdenum oxide, tantalum oxide, cerium oxide, rare earth oxides, silicon carbide, hafnium carbide, bismuth telluride, gallium nitride, silicon, germanium, iron oxide, titanium boride, zirconium boride, zirconates, aluminates, tungstates, carbides, manganates, ruthenates, borates, hydrides, oxides, oxynitrides, oxycarbides, halides, silicates, phosphides, nitrides, chalcogenides, complex oxides such as dielectrics and ferrites.

Additionally, the active layer can be porous or dense, flat or tapered, uniform or non-uniform, planar or wavy, straight or curved, non-patterned or patterned, micron or sub-micron, grain sized confined or not, or a combination of one or more of these.

The solvent for the slip can be organic, inorganic, emulsion, aqueous, acidic, basic, neutral, charged, uncharged, stable or metastable. The stacking can be manual, automatic, computer aided, optically aligned, or robotically aligned.

In one embodiment, the slip, slurry, or ink can comprise nanoscale powders only along with the solvent. In another embodiment, the slip, slurry, or ink can comprise can be a mixture of nanoscale powders, submicron, and micron sized powders. In yet another embodiment, the slip, slurry, or ink can comprise nanoscale powders as dopants. The mix may be heterogeneous or homogeneous, the latter being preferred. For the scope of this invention, the slip, slurry, or ink has greater than 0.01% of its total solids as added nanoscale size powders.

The tapes can be stacked in any pattern. The device may just have one layer or multiple layers, the preferred embodiment being multiple layers. The individual layers can be the same or different formulation. Additionally, it is possible to replace or combine one of the active layers with a layer capable of a secondary but desired function. For example, one or more of the layers can be replaced with resistive layers by design to provide heat to the device or component. In some situations it may be desirable to have one or more active layers replaced with EMI (electromagnetic interference) filter layers to minimize noise by inductively or capacitively coupling with the active layer. In another situation, one of the layers can be air or an insulating layer in order to provide thermal isolation to the active layer. In yet another situation, sensing layers may be provided sense the temperature or density or concentration of one or more species in the feed or processed or recycle stream. In yet another situation, electrochemical couple layers may be provided to internally generated electricity and energy needed to satisfactorily operate the device. In other conditions, the electrode layers can be provided to function as anodes and cathodes. In some situations, the device may be a minor part of the multilaminate device and the device containing device can have primary function of reliably providing an electrical, thermal, magnetic, electromagnetic, optical, or structural function in an application. The layers can also comprise multilaminates of different material formulations. These different formulations can have different properties that allow the fabrication of a functionally graded material (FGM).

The multilayer stack may have a rectangular shape. However, the stack shape can also be circular, elliptical or any other shape. Additionally, the edges may be rounded or sharp. The product could be finished, polished, cut, plated, terminated, rounded, radiatively treated, or processed further with the motivation to improve properties or to impart new performances.

8. Uses

Applications provided by this invention include: surgical blades, cryogenic slicing, blades for cutting polymers and fabrics, blades for scissors, utility knives, hunting knives, snap knives, and art & hobby knives. Ceramic blades are currently being proposed in the aforementioned applications due to the fact that they outwear steel knives 50-100 times and carbide knives 7 to 10 times. The cost drivers for blades used in industrial applications is quite high due to the fact that the downtime associated with replacing a blade is more costly (i.e., non-productive downtime) than the material for the blade. This invention proposes to leapfrog the current technology by reducing costs, and by extending the performance of the part and the lifetime of the blades significantly. Any structural components could be manufactured using this invention with the motivation to reduce cost, increase volume, and/or improve performance. Additional applications include ceramic, metal, or composite seals. These low-profile components can be fabricated by a multi-layer build-up process described in FIG. 5.

Figure 6:
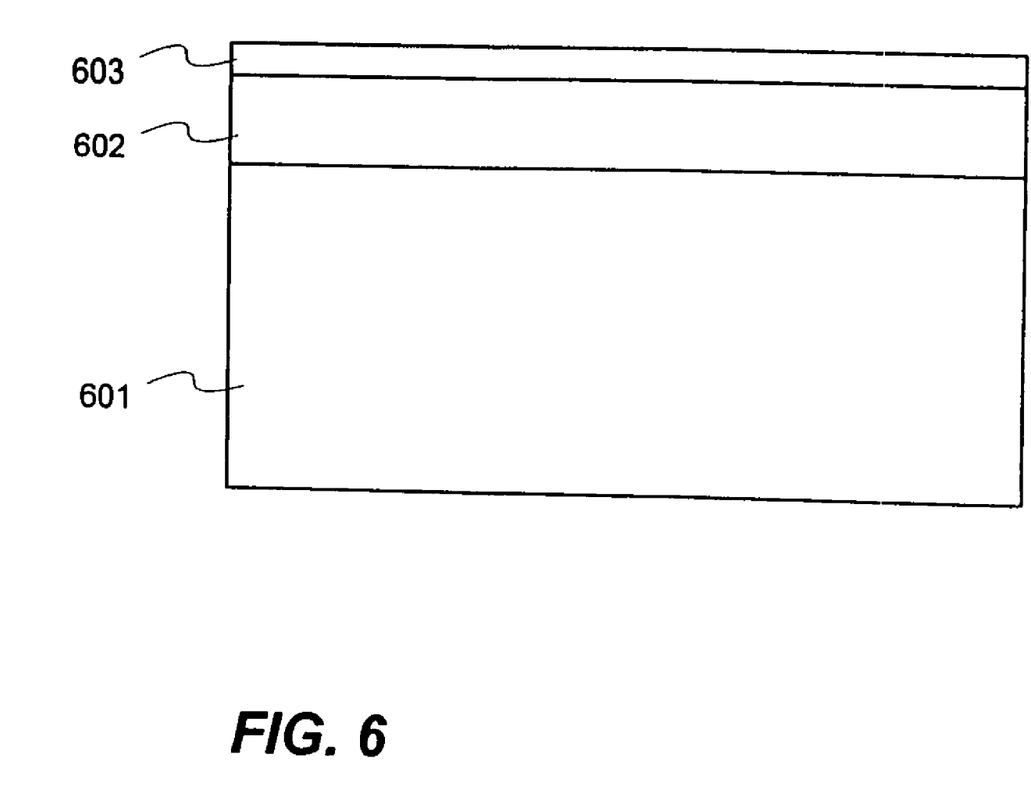
FIG. 6 illustrates and exemplary with a porosity gradient through the thickness.

An additional application of the teachings herein is functionally graded parts or components that are dense or porous. Illustration includes a filter with a porosity gradient through the thickness as shown in FIG. 6, for example. In the filter application shown in FIG. 6, a relatively thick porous substrate 601, an intermediate porosity layer 602, and a nanocrystalline layer 603 having low relative porosity comprise similar materials, and may use a single powder composition as a starting material. Post-processing techniques described herein are used to alter the porosity of the powder as it is deposited or formed on the preceding layers using, for example, the slurry processing techniques described above.

This invention is contemplated to have application in the biomedical field, among other fields. For example, the present invention may be applied to producing implant materials, monitors, sensors, drug delivery devices, and biocatalysts from nanoscale powders using the multi-layer laminating process to produce three-dimensional shapes.

This invention may also be applied the solid oxide fuel cell (SOFC) area. Zirconia is one of the materials that has been investigated as the solid electrolyte for SOFC's. Solid electrolyte components can be made by tape casting multi-layer devices with a very high surface area (i.e., nanomaterial based electrolytes).

Additionally, the post-processed nanopowders made in accordance with the present invention may be used to produce electrical devices such as varistors, inductors, capacitors, batteries, EMI filters, interconnects, resistors, thermistors, and arrays of these devices from nanoscale powders. Moreover, magnetic components such as giant magnetoresistive GMR devices may be manufactured from nanoscale powders produced in accordance with the present invention as well as in the manufacture thermoelectric, gradient index optics, and optoelectronic components from nanoscale powders.

The teachings in this invention are contemplated to be useful in preparing any commercial product from nanoscale powders where performance is important or that is expensive to produce or is desired in large volumes. Moreover, post-processed fine powders have numerous applications in industries such as, but not limiting to biomedical, pharmaceuticals, sensor, electronic, telecom, optics, electrical, photonic, thermal, piezo, magnetic, catalytic and electrochemical products. Table 1 presents a few exemplary applications of post-processed powders.

TABLE 1

| Application | Post-processed Ceramic Nanopowder Composition |
|---|---|
| Capacitors, Resistors, Inductors, Integrated Passive Components | Barium titanate, strontium titanate, barium strontium titanates, silicates, yttria, zirconates, nanodopants, fluxes, electrode formulations |
| Substrates, Packaging | Alumina, aluminum nitride, silicon carbide, cordierite, boron carbide, composites |
| Piezoelectric transducers | PZT, barium titanate, lithium titanates, nanodopants |
| Magnets | Ferrites, high temperature superconductors |
| Electroptics | $(Pb,La)(Zr,Ti)O_3$, nanodopants |
| Insulators | Alumina |
| Varistors | ZnO, titania, titanates, nanodopants |
| Thermistors | Barium titanates, mangnates, nanodopants |
| Fuel Cells | Zirconia, ceria, stabilized zirconia, interconnects materials, electrodes, bismuth oxide, nanodopants |

TABLE 1-continued

| Application | Post-processed Ceramic Nanopowder Composition |
|---|---|
| Mechanical components, sealants, adhesives, gaskets, sporting goods, structural components | Silicon nitride, zirconia, titanium carbide, titanium nitride, titanium carbonitride, boron carbide, boron nitride, dispersion strengthened alloys |
| Biomedical | Aluminum silicates, alumina, hydroxyapatite, zirconia, zinc oxide, copper oxide, titania |
| Coatings | Indium tin oxide, nanostructured non-stoichiometric oxides, titania, titanates, silicates, chalcogenides, zirconates, tungsten oxide, doped oxides, concentric coated oxides, copper oxide, magnesium zirconates, chromates, oxynitrides, nitrides, carbides, cobalt doped titania |
| Pigments | Oxynitrides, titania, zinc oxide, zirconium silicate, zirconia, doped oxides, transition metal oxides, rare earth oxides |
| Engineered plastics | Silicates, zirconates, manganates, aluminates, borates, barytes, nitrides, carbides, borides, multimetal oxides |
| Catalysts | Aluminum silicates, alumina, mixed metal oxides, zirconia, metal doped oxides, zeolites |
| Abrasives, Polishing Media | Aluminum silicates, zirconium silicates, alumina, ceria, zirconia, copper oxide, tin oxide, zinc oxide, multimetal oxides, silicon carbide, boron carbide |

Other embodiments of the invention will be apparent to those skilled in the art from a consideration of the specification or practice of the invention disclosed herein. It is intended that the specification and examples be considered as exemplary only, with the true scope and spirit of the invention being indicated by the claims.

9. Example 1

The following batch was mixed:

| MATERIAL | DESCRIPTION | AMOUNT (Vol. %) |
|---|---|---|
| SiC | NRC powder | 10 |
| A 203 | Dispersant | 3.3 |
| B74001 (solids) | Binder | 10.4 |
| B74001 (liquid) | Binder | 8.5 |
| Toluene | Solvent | 77.8 |

The mixture was milled with zirconia media for 12 hours in a polyethylene bottle. After milling, the slip was removed from the bottle and tape cast (Model #101, Drei-Tech Corporation) through a 165 micron gap doctor blade. The final thickness of the tape after drying was approximately 30 microns. A total of 33 layers of tape were stacked and tacked (Model #NT300, Pacific Trinetics Corp., San Marcos, Calif.) under SiC blades. The layers were then laminated together at a temperature of approximately 65° C. at a pressure of 26.7 MPa in an isostatic lamination system (Model #IL-4004, Pacific Trinetics Corp., San Marcos, Calif.). The binders were burned out in nitrogen (Model #Inert Gas Oven, Blue M Electric, Watertown, Wis.) with the following schedule: 2° C./min to 200° C. for 1 hour, and 1° C./min to 550° C. for 6 hours.

The laminated material was sectioned with a commercially available razor blade into the approximate geometry of the finished blade. An edge was put into the SiC blade by sandwiching it between two pieces of stainless steel and holding it at an angle of 45 degrees (see FIG. 1) while running it across SiC abrasive paper (1200 grit).

10. Example 2

The following batch was mixed:

| MATERIAL | DESCRIPTION | AMOUNT (Vol. %) |
|---|---|---|
| SiC | Superior Graphite 059 | 10 |
| A 203 | Dispersant | 1.1 |
| B74001 (solids) | Binder | 12.2 |
| B74001 (liquid) | Binder | 20.9 |
| Toluene | Solvent | 55.8 |

The balance of the process was conducted in accordance with Example 1.

11. Example 3

Thermistor

Nanoscale barium titanate slip is prepared. An ink of nickel is prepared. A tape of barium titanate is formed. The tape is sliced into sections and electrode applied on one, surface. Alternating stacks of titanate and nickel electrode are placed to form a multilayer structure. The laminate is cured and then diced into multilayer PTC thermistor elements. The elements are sintered into dense structure and then terminated. The resulting device is used to control and monitor temperature. Alternatively, they are used as electromagnetic energy limiting devices. In another example, the titanate powder can be replaced with nanoscale manganate powder to form an NTC multilayer thermistor.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A method for modifying the shape of nanomaterials comprising:
    processing nanomaterials of a first aspect ratio by shear at a temperature greater than the softening temperature of the nanomaterials, wherein the temperature is between $0.2*T_m$ and $0.95*T_m$, wherein $T_m$ is the melting point temperature of the nanomaterials in Kelvin; and
    collecting nanomaterials with an aspect ratio different than the first aspect ratio.

2. The method of claim 1 wherein the nanomaterials comprise an inorganic substance selected from the group consisting of: oxides, carbides, nitrides, chalcogenides, metals, and alloys.

3. The method of claim 1 wherein the nanomaterials comprise a purity greater than 99.9% by metal basis.

4. The method of claim 1, further comprising providing nanomaterials of a first aspect ratio, the providing comprising:
    vaporizing at least one precursor in a thermal reactor; and
    processing the at least one vaporized precursor under thermokinetic conditions that favor nucleation of solid nanopowder from the vaporized precursor.

5. The method of claim 4, further comprising:
    atomizing the at least one precursor before vaporizing the at least one precursor; and
    quenching the solid nanopowder nucleated from the vaporized precursor.

6. The method of claim 1, wherein the nanomaterials comprise inorganic nanoparticles having a mean particle size less than 250 nanometers.

7. A method for modifying the shape of nanomaterials comprising:
    processing nanomaterials of a first aspect ratio by shear at a temperature greater than the softening temperature of the nanomaterials but less than a melting temperature of the nanomaterials; and
    collecting nanomaterials with an aspect ratio different than the first aspect ratio.

8. The method of claim 7, further comprising providing nanomaterials of a first aspect ratio, the providing comprising:
    vaporizing at least one precursor in a thermal reactor; and
    processing the at least one vaporized precursor under thermokinetic conditions that favor nucleation of solid nanopowder from the vaporized precursor.

9. The method of claim 8, further comprising:
    atomizing the at least one precursor before vaporizing the at least one precursor; and
    quenching the solid nanopowder nucleated from the vaporized precursor.

10. The method of claim 7, wherein the nanomaterials comprise inorganic nanoparticles having a mean particle size less than 250 nanometers.

11. A method for modifying the shape of nanomaterials comprising:
    processing inorganic nanoparticles of a first aspect ratio and having a mean particle size less than 250 nanometers by shear at a temperature greater than the softening temperature of the nanoparticles but less than a melting temperature of the nanoparticles;
    wherein the processing changes the aspect ratio of the nanoparticles.

12. The method of claim 11, wherein the nanoparticles have a mean particle size less than 100 nanometers.

13. The method of claim 11, wherein the temperature is between $0.2*T_m$ and $0.95*T_m$ wherein $T_m$ is the melting point of the nanoparticles in Kelvin.

14. The method of claim 11, wherein the nanoparticles comprise a substance selected from the group consisting of: oxides, carbides, nitrides, chalcogenides, metals, and alloys.

15. The method of claim 11, wherein the nanoparticles comprise a purity greater than 99.9% by metal basis.

16. The method of claim 11, further comprising providing nanoparticles of a first aspect ratio, the providing comprising:
    atomizing at least one precursor;
    vaporizing the at least one precursor in a thermal reactor;
    processing the at least one vaporized precursor under thermokinetic conditions that favor nucleation of solid nanoparticles from the vaporized precursor; and
    quenching the solid nanoparticles nucleated from the vaporized precursor.

* * * * *